(12) United States Patent
Shi et al.

(10) Patent No.: US 9,610,831 B2
(45) Date of Patent: Apr. 4, 2017

(54) TONNEAU COVER INTERNAL FRAME MOUNTING SYSTEM

(71) Applicants: Hang Shi, Changzhou (CN); Hongjuan Zheng, Changzhou (CN)

(72) Inventors: Hang Shi, Changzhou (CN); Hongjuan Zheng, Changzhou (CN)

(*) Notice: Subject to any disclaimer, the term of this patent is extended or adjusted under 35 U.S.C. 154(b) by 0 days.

(21) Appl. No.: 14/709,576

(22) Filed: May 12, 2015

(65) Prior Publication Data

US 2015/0329149 A1 Nov. 19, 2015

Related U.S. Application Data

(60) Provisional application No. 62/000,212, filed on May 19, 2014.

(51) Int. Cl.
| | | |
|---|---|---|
| *B62D 33/077* | (2006.01) | |
| *B60J 7/16* | (2006.01) | |
| *B60J 7/10* | (2006.01) | |

(52) U.S. Cl.
CPC ............. *B60J 7/102* (2013.01); *B60J 7/1607* (2013.01); *B62D 33/077* (2013.01)

(58) Field of Classification Search
CPC ........ B60J 7/102; B60J 7/1607; B62D 33/077
See application file for complete search history.

(56) References Cited

U.S. PATENT DOCUMENTS

| | | | |
|---|---|---|---|
| 5,480,206 A * | 1/1996 | Hathaway | ................ B60J 7/104 292/150 |
| 5,906,407 A | 5/1999 | Schmeiched | |
| 6,893,073 B2 | 5/2005 | Wheatley | |
| 7,334,830 B2 | 2/2008 | Weldy | |
| 8,814,249 B2 * | 8/2014 | Rossi | ....................... B60J 7/102 296/100.14 |

\* cited by examiner

*Primary Examiner* — Glenn Dayoan
*Assistant Examiner* — Melissa A Black

(57) ABSTRACT

A tonneau cover system for a pickup truck cargo bed includes two longitudinal side rails attached to at least one fore and aft cross rail. Located at the outer edges of the cross rails are a series of individual holes having interconnection to an integrated slot used in the lateral adjustment of an adjustable clamp assembly. A series of clamp assembly are used to secure a tonneau cover system to the top wall surfaces of a pickup truck cargo bed.

17 Claims, 4 Drawing Sheets

TONNEAU COVER INTERNAL FRAME MOUNTING SYSTEM

CROSS-REFERENCE TO RELATED APPLICATIONS

This application is a non-provisional application claiming domestic benefit under 35 U.S.C. §119 of U.S. provisional application Ser. No. 62/000,212, filed May 19, 2014, the entire disclosure of which is herein incorporated by reference in its entirety.

FIELD OF THE INVENTION

In general, the present invention relates to a pickup truck cargo bed covering system and more particularly, to a truck cargo bed covering system having two longitudinal frame rails connected by at least two lateral rails. The system of longitudinal and lateral rails form an internal framework used in the support and mounting of a cover system. Within the lateral rails, provisions are made for an adjustable clamp system for use in securing of the internal frame of a covering system to the top surfaces of a cargo bed wall.

BACKGROUND AND RELATED ART

Over the years, a wide variety of covering systems have been developed for truck cargo beds and where these cover systems have become known as "tonneau covers." For years tonneau covers have been utilized to protect the interior of the cargo bed against weather, environmental contaminants and where, in some cases, to improve the aesthetic looks of the vehicle. Tonneau covers are typically constructed symmetrical to the cargo bed and where mounting is typically in synchronization with the top walls of the cargo bed without a significant height increase.

Originally tonneau covers were designed by upholstery shops and were typically constructed of vinyl or other polymer, fabrics or canvas. Unfortunately these covers were sometimes difficult to handle and often led to corrosion issues developing around snap fasteners used to hold the cover to the cargo bed.

Today most tonneau cover systems designed to prevent corrosion issues are constructed as one piece systems employing glass fiber, plastics or weather resistant fabrics over an internal frame work. This internal frame is often employed for cover support, mounting and ease of access to stowed cargo within the cargo bed.

Occasionally the internal frame work will employ hinged panels to provide one or more opening sections or, in other designs, the covering can be disconnected from the internal frame work and rolled up. Thus, in all cases, these various designs provide ease of installation or access to stowed cargo without requiring the total removal of the covering system from the cargo bed.

Quick release clamps are often employed to allow easy installation of the covering system to the cargo bed and where, on occasion, it may be necessary to remove the cover due to hauling a cargo that may exceed the height limitations of the cargo bed.

As an example, a clamping method can be seen in U.S. Pat. No. 5,906,407 issued to Schmeichels. Schmeichels discloses the use of a series of C-clamps which are used to fasten an internal framework to a cargo bed.

Similarly, U.S. Pat. No. 6,893,073 issued to Wheatley discloses the use of clamps composed of two members which bolt together to retain an internal frame rail to a downwardly facing wall within a cargo bed. Wheatley discloses an internal frame rail which provides a hook where one of two clamp members can be hung and tightened together to produce compression attachment of the frame rail to the cargo bed.

U.S. Pat. No. 7,334,830 issued to Weldy discloses an internal framework having cross framing. Within the cross framing, a single slotted track is used to provide slide adjustability for the clamping system.

While all prior art referenced above has promoted the use of covering systems, they are not without faults. For example, U.S. Pat. No. 6,893,073 issued to Wheatley requires the use of tools and is somewhat complicated and cumbersome for consumer use during installation or removal of the covering system from the cargo bed.

U.S. Pat. No. 7,334,830 issued to Weldy provides quick and easy installation or removal for the consumer. However in Weldy's slot mechanics, the clamp hangers must be installed during the manufacturing process thus increasing costs to the consumer.

Our response to some of the aforementioned faults in the methods and systems used in the accessing of stowed cargo or for the installation of the covering system to the cargo bed will be addressed by the field of the present disclosure. These and other features and advantages may be incorporated into certain embodiments of the invention and will become more fully apparent from the following description and appended claims, or may be learned by the practice of the invention as set forth hereinafter. The present invention does not require that all the advantageous features and all the advantages described herein be incorporated into every embodiment of the invention.

SUMMARY OF THE INVENTION

A primarily object of the present invention is to provide ease of installation or access to stowed cargo within a cargo bed when protected by a covering system. Typically, most cover systems incorporate an internal framework to provide a rigid structure for a cargo bed covering material.

Conventional mechanisms for accessing stowed cargo is typically via hinge assemblies attached to cross support framing and where clamps are often employed to achieve a closed locked position for a hinged covering assembly.

The present invention provides two longitudinal frame rails connected by at least two end lateral rails used to provide stability to a cargo bed covering material. Located within the lateral support rail's outer edges, are a series of individual openings having interconnection to a slot. The opening provides an installation port for a threaded rod member having at one end, a head diameter larger than a threaded shank portion. Once the rod member has been inserted through the opening port it then can be maneuvered in position to slide into a slot which provides housing and lateral movement for adjustment.

The port opening is configured so as to have a larger diameter opening then the rod head. Prior to entry into the slotted area, the head end of the rod has to overcome an elevated wall used to prevent the rod, once installed, from exceeding lateral movement and falling into the insertion opening. Threads are incorporated at the opposite end of the rod head and used for mating and height adjustment of a threaded clamp. Both vertical and lateral adjustments are achieved for a clamping assembly once the cover is ready to be mounted to the cargo bed.

BRIEF DESCRIPTION OF THE DRAWINGS

The present invention will become more fully understood from the detailed description and the accompanying drawings.

DETAILED DESCRIPTION OF THE PREFERRED EMBODIMENTS

Figure 1:
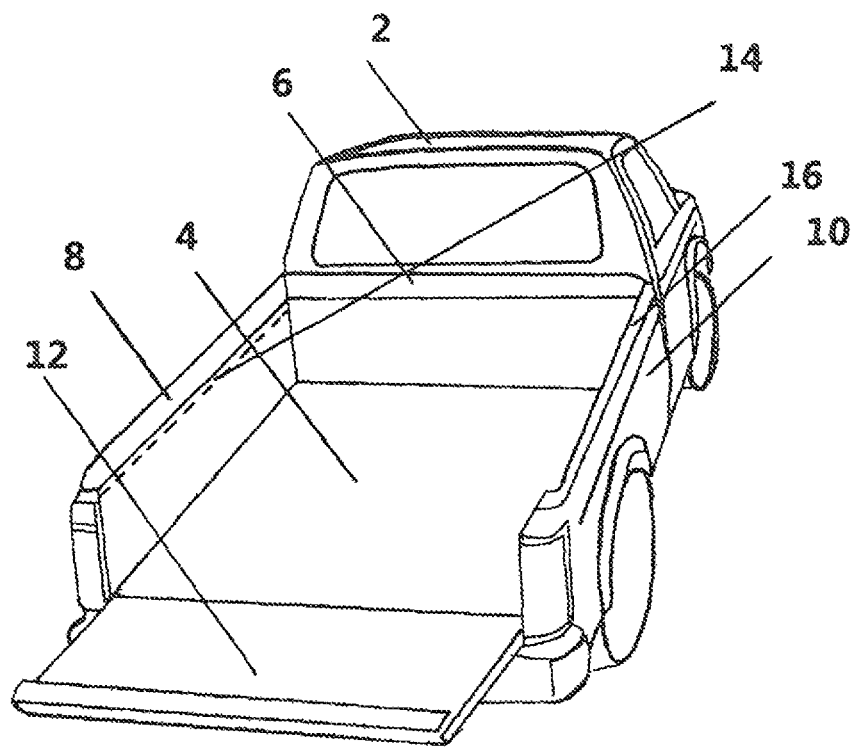
FIG. 1 provides a perspective illustration of a pickup truck having a cargo bed.

In reference to FIG. 1, pickup truck 2 is equipped with a cargo bed 4. Cargo bed 4 comprises a front wall 6, left side wall 8, right side wall 10 with an opening back wall or tailgate 12. For added wall strength, a cargo bed will typically employ rolled or mated edges 14 which are exposed to the interior of the cargo bed. Typically, these mated edges are joined together during the construction phase of the cargo bed 4 where inner and outer walls are joined together to provide strength to the cargo bed structure. This type of wail construction results in the formation of an approximately one inch downwardly extending walls 14. These downward walls 14 run longitudinally in relationship to both left and right walls of the cargo bed 4. Typically, all cargo bed walls are symmetrically constructed resulting in the provision of wall top surfaces 8 and 16, onto which a protective covering system can be mated.

Figure 2:
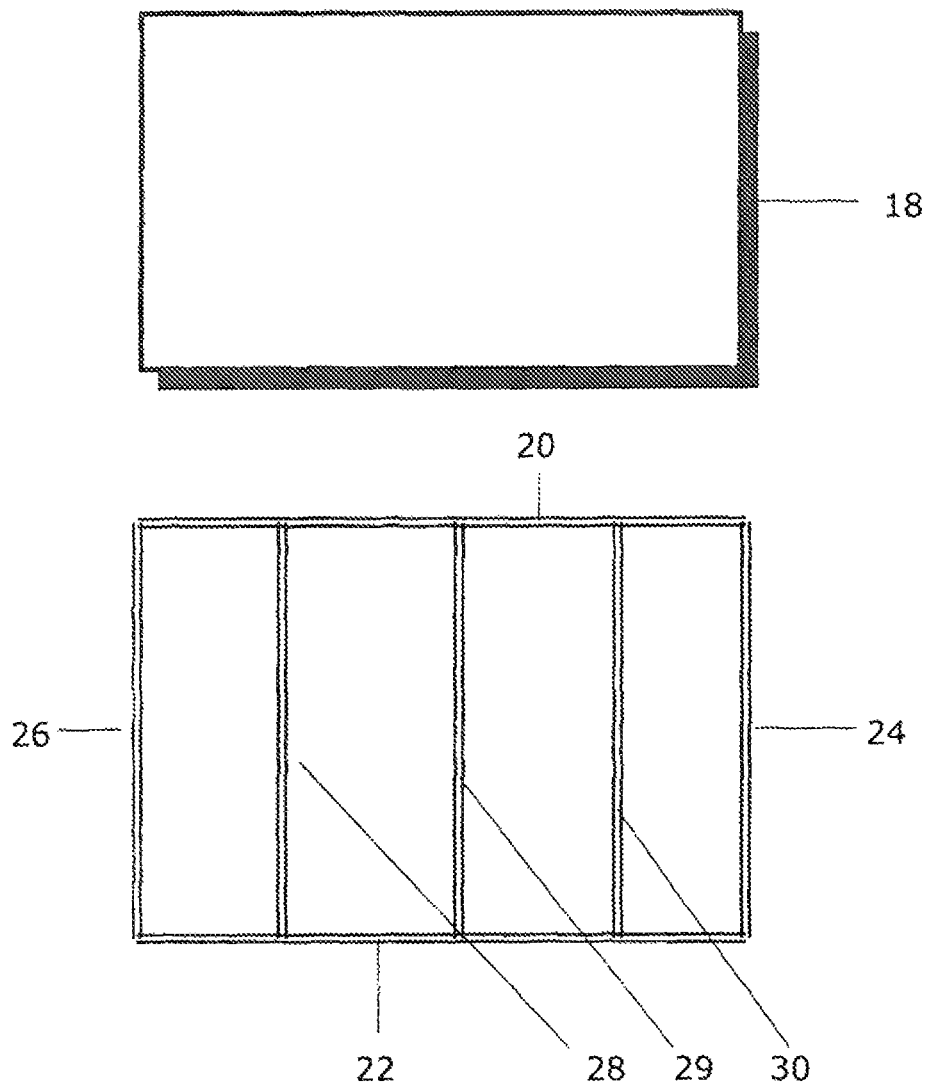
FIG. 2 is a perspective view illustrating a typical internal framework tar a covering system.

FIG. 2 illustrates a tonneau cover internal support frame having longitudinal side rails 20 and 22 attached by cross supporting rails, 24, 26, 28, 29 and 30. These cross support rails 24, 26, 28, 29 and 30 add rigidity to the side rails 20 and/or 22 and provide attachment and support for covering material 18. For ease of installation, both longitudinal side rails 20 and 22 can be positioned adjacent to the top surface of cargo bed sidewalls 8, 10, to provide installation support with fore and aft lateral rails 24 and 26 used for fore and aft body alignment during the mounting of the covering system to the cargo bed 4. Either the side rails, the cross supporting rails, or any one of the side or cross rails can be formed of metal, polymer or composites.

Figure 3:
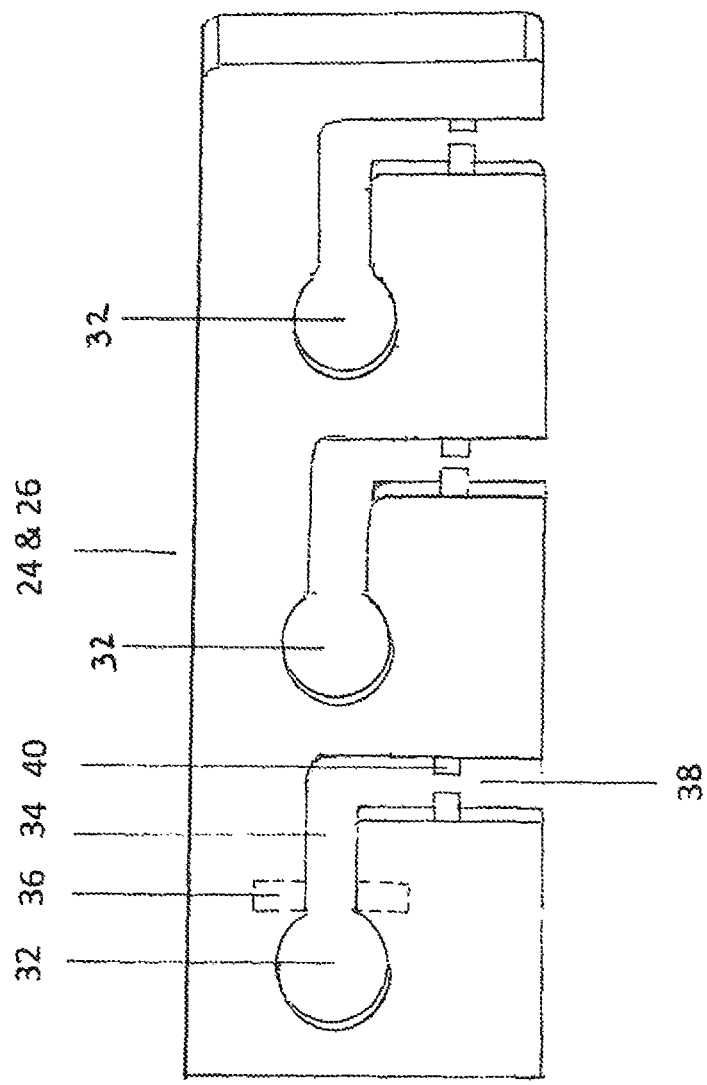
FIG. 3 is a perspective view illustrating individual slotted openings within a cross support rail.

FIG. 3 illustrates lateral support framing 24 and 26 with modifications to include a series of individual openings 32, having direct connection to a longitudinal slot 34. The series of longitudinal slots provide hanging adjustment for a suspended rod member 42 having threaded connection used for the vertical adjustments of a clamp member. The series of openings 32 are larger in diameter for the insertion of a threaded rod member 42 having an incorporated head 44, larger in diameter, than interconnecting slot 34. At the end of the slot 34, in closest proximity to the insertion opening 38, a wall 36 protrudes upwards away from the insertion opening 38 to prevent the rod member head 44 from exceeding lateral movement and sliding back out of the openings 32. The rod member may comprise polymeric materials, such as engineering polymers, or metal. Nylon, including Nylon 6®, Nylon 66® are exemplary of the engineering polymers, while steel, aluminum and their alloys are representative of the metals. It should be understood that the exemplification of support framing 24 and 26 is not exhaustive, but exemplary only and the invention may be applied to various portions of the framework of the tonneau system.

Located at the opposite end of slot 34, a collapsing tab 40 is incorporated as a wall stop to prevent the rod member 42 traversing out of slot 34 and into a secondary slot 38. This secondary slot 38 is used for rod member shortage and detainment when not in use.

Figure 4:
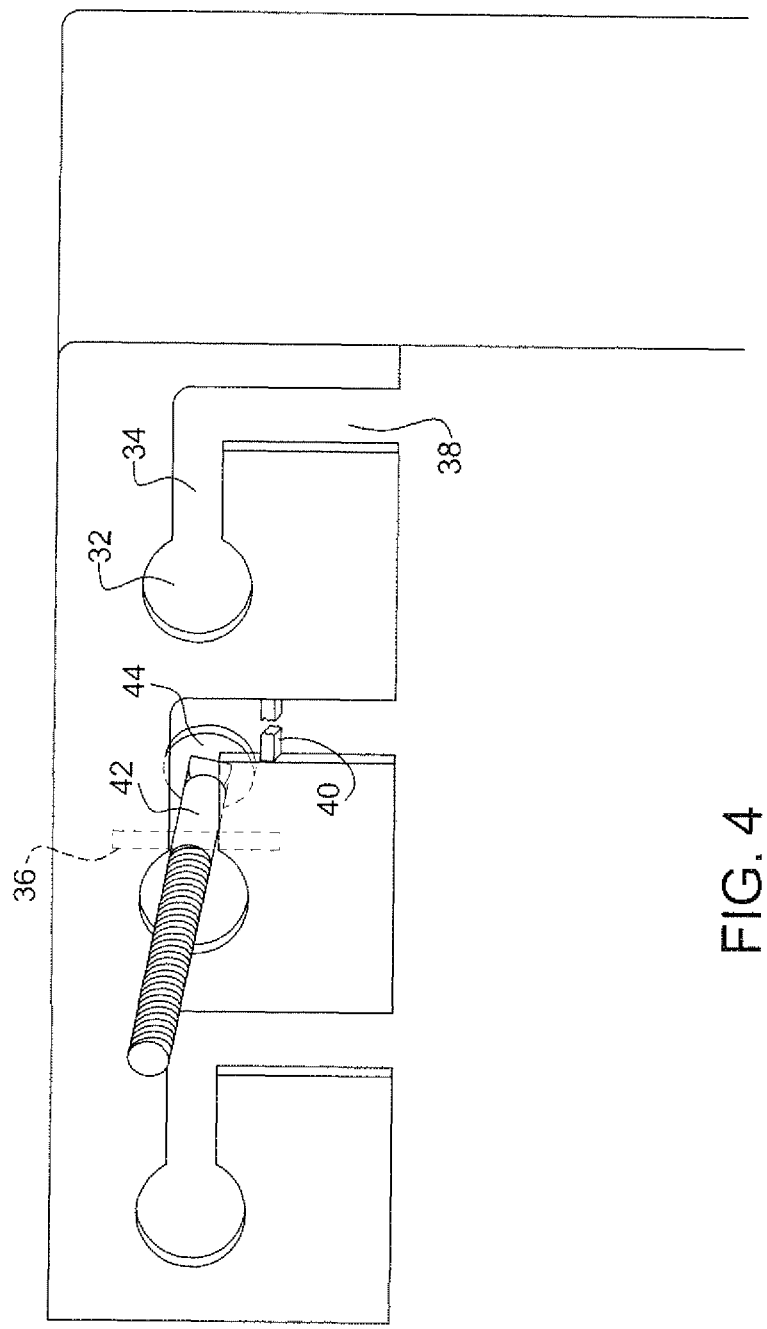
FIG. 4 is a perspective view illustrating the integration of a threaded rod in relationship to the slotted opening.

Now, with reference to FIG. 4, the rod member consists of a head 44 having an increased diameter than the shank threaded portion. Rod member 44 is inserted into the cross support rail 24 through port opening 32. Rod member 44, upon insertion, is required to vertically clear an increased wall height 36, used as a stop prior to entry into slot 34. Slideability for lateral adjustment is achieved once rod member 42 is in position with the larger head diameter 44 resting on top of slot housing and where lateral adjustment is provided for by sliding the shank portion within the length of slot 32. Rod 42 is used in the mating of a threaded clamp and where vertical adjustments can be achieved by increasing or decreasing the number of rotations on the threaded rod member.

A secondary slot 38, within the lateral support, is used for storage of the adjustable rod and where secondary slot 38 provides a collapsible tab 40, used to apply compression detainment of the rod when not in use.

The present invention does not require the use of tools during installation or in the accessing of stowed cargo.

The above description of the invention reveals what would be obvious for variations thereof and where such variations are not to be considered a deviation from the scope of the invention. Therefore, such modifications which are obvious to persons skilled in the art are also to be considered encompassed by the scope of the appended claims.

What is claimed is:

1. In a tonneau covering system for a cargo bed of a vehicle, wherein said cargo bed comprises symmetrical disposed downwardly extending side walls and at least a downwardly extending front wall, and accepts a pair of longitudinal side rails fastened together by at least one cross rail, used to assist in the positioning and mounting of a tonneau covering system, the improvement comprising an adjustable clamp system for use in securing an internal framework of the covering system to the downwardly extending walls; said adjustable clamp system comprising a series of insertion openings connected to primary longitudinal slots; a rod member; said rod member comprising an enlarged head portion and a shank portion integral with said head portion; said head being configured of a size small enough to pass through the insertion opening but too large to pass through the primary longitudinal slot; said shank portion configured of a size to traverse the slot and comprising a threaded portion of the rod member.

2. The system of claim 1, wherein the primary longitudinal slot is interconnected with a secondary slot; the secondary slot being configured of a size to permit the shank to traverse the secondary slot, but small enough to retain the head.

3. The system of claim 1, further comprising a first elevated wall adjacent the insertion opening acting as a stop to prevent the head from exiting the insertion opening once the shank is in engagement with the primary slot.

4. The system of claim 2, further comprising a collapsible tab in the secondary slot to retain the rod member in the secondary slot.

5. The system of claim 3, further comprising a second elevated wall located at the opposite end of the primary longitudinal slot to prevent the threaded member from sliding from the primary slot into the secondary slot.

6. The system of claim 3, wherein said first elevated wall includes a center relief section having the approximate size of the shank portion of the rod member, and where the relief section allows passage of the rod member into the primary slot.

7. The system of claim 1, wherein the internal framework comprises a series of cross rails and each of said cross rails comprise the adjustable clamp system comprising a series of insertion openings interconnected with primary longitudinal slots.

8. The system of claim 1, wherein the tonneau covering system comprises a weather resistant tonneau cover.

9. The system of claim 8, wherein the tonneau cover is at least one selected from the group consisting of glass fiber, plastics or weather resistant fabrics.

10. The system of claim 8, wherein the weather resistant fabric comprises canvas.

11. The system of claim 8, wherein the tonneau cover is one piece.

12. The system of claim 1, wherein the framework, is formed of at least one material selected from the group consisting of metal and polymers.

13. The system of claim 1, wherein the series of insertion openings are adjacent an end of the at least one cross rail.

14. The system of claim 1, further comprising multiple cross rails.

15. The system of claim 14, wherein the series of insertion openings are adjacent an end of each of the multiple cross rails.

16. The system of claim 13, wherein the series of insertion openings are adjacent each end of the at least one cross rail.

17. The system of claim 15, wherein the series of insertion openings are adjacent each end of each of the multiple cross rails.

* * * * *